(No Model.)

W. C. SALMON.
STEAM COOKING APPARATUS.

No. 566,228. Patented Aug. 18, 1896.

Witnesses:
Robert Everett
Dennis Sumby

Inventor:
William C. Salmon
By James L. Norris
Atty.

UNITED STATES PATENT OFFICE.

WILLIAM C. SALMON, OF PALATINE, ILLINOIS.

STEAM COOKING APPARATUS.

SPECIFICATION forming part of Letters Patent No. 566,228, dated August 18, 1896.

Application filed April 13, 1896. Serial No. 587,323. (No model.)

*To all whom it may concern:*

Be it known that I, WILLIAM C. SALMON, a citizen of the United States, residing at Palatine, in the county of Cook and State of Illinois, have invented new and useful Improvements in Steam Cooking Apparatus, of which the following is a specification.

This invention relates to steam cooking apparatus and is an improvement on the apparatus for which Letters Patent No. 429,099 were issued to me May 27, 1890, and the purpose of my present improvement is to provide an apparatus of this type especially adapted for use in connection with gas or gasolene stoves, and to provide means for the thorough drainage of the different cooking sections or vessels.

To these ends my invention consists in the features and in the construction or arrangement or parts hereinafter described, reference being had to the accompanying drawings, forming a part of this specification, wherein—

Figure 1:
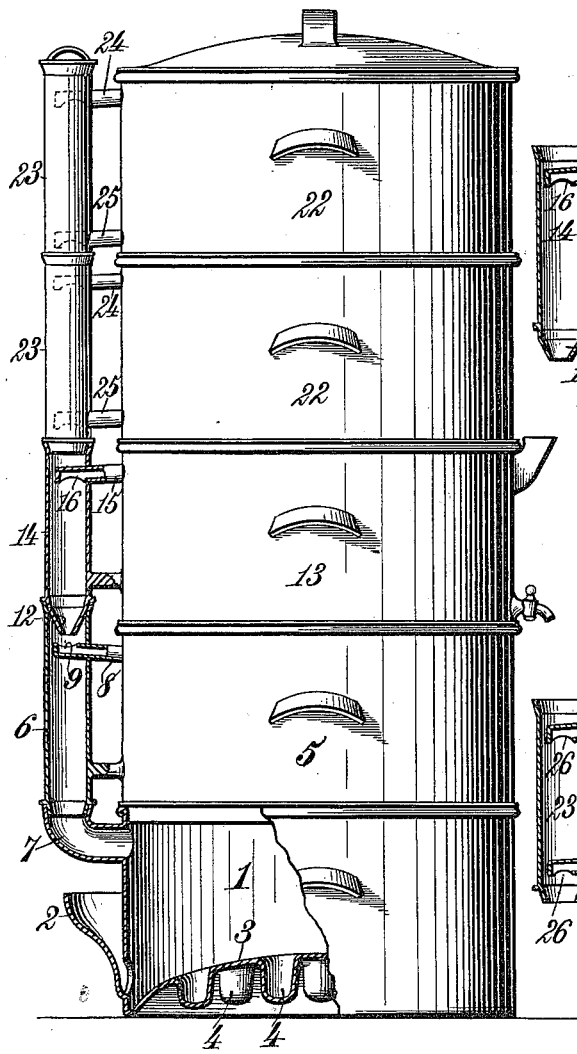
Figure 2:
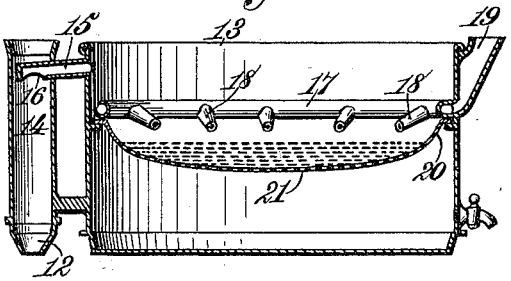
Figure 3:
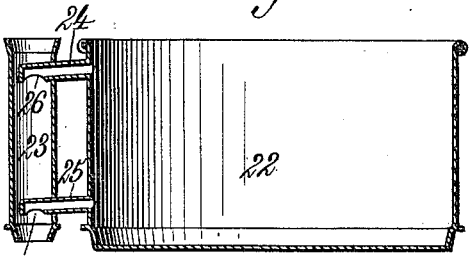

Figure 1 is a side elevation of my improved apparatus. Fig. 2 is a sectional view of the coffee-cooking vessel, and Fig. 3 is a similar view of one of the other cooking vessels.

In the said drawings the reference-numeral 1 indicates the steam generator or boiler, which is preferably of cylindrical form and provided with an open gage-cup 2, which projects from the vertical wall of the boiler and communicates with its interior to enable its contents to be replenished and to indicate to the operator the quantity of water present in the boiler. The bottom 3 of the boiler is concavo-convex in shape, the convex side being uppermost, and is provided with a plurality of downwardly-projecting tubes 4, that are closed at their lower ends and at their upper ends communicate with the interior of the boiler. Superimposed upon the boiler 1 is a receptacle 5, designed for cooking soup, the bottom of which fits the top of the boiler steam-tight and is exposed to the steam generated in the latter.

Mounted upon the vertical wall of the vessel 5 is a section of steam-conveying pipe 6, the upper end of which is approximately upon a level with the top of the vessel and at its lower end fits in the top of an elbow 7, that is fitted to and communicates with the boiler 1. A pipe 8 communicates at one end with the upper portion of the vessel 5 and at its other end projects into the steam-conveying pipe 6 and is provided upon its upper side with an opening 9, by means of which steam ascending the pipe 6 may enter the vessel.

Fitted in the upper end of the section 6 of the steam-conveying pipe is a funnel 12, the lower contracted end of which is directly above the opening 9 in the pipe 8. A cylindrical coffee-cooking vessel 13 is superimposed upon the soup vessel 5 and is provided with a section of steam-conveying pipe 14, that fits in the upper end of the section 8 and is provided with a pipe 15, that communicates with the upper portion of the coffee-cooking vessel 13, and is provided with an opening 16 on its under side for the admission of steam from the steam-conveying pipe. Both the pipes 8 and 15 are of smaller diameter than the steam-conveying pipe, so that steam may freely ascend in the latter. A draw-off cock is fitted in the lower portion of the coffee-cooking vessel 13, by means of which the coffee may be drawn off from the latter. A hollow annulus 17 is fitted in the upper portion of the coffee-cooking vessel 13 and is provided with a series of radial spouts 18. A funnel-shaped filling-spout 19 is mounted upon the vertical wall of the vessel 13 and communicates with the hollow annulus 17. A drip-pan 20, having a perforated bottom 21, is arranged beneath the annulus 17 and is designed for the reception of the ground coffee, the water poured in the spout 19 being discharged by the spouts 18 onto the coffee.

A series of cooking vessels 22 are superimposed one upon another and are mounted on the coffee-cooking vessel 13, each of said vessels being provided with a section of steam-conveying pipe 23, adapted to form a continuation of the pipe 8, and each of said sections is provided with two pipes 24 and 25, that respectively communicate with the upper and lower portions of the adjacent cooking vessel and with the pipe 23, the said pipes 24 and 25 being each provided upon its under side with an opening 26, whereby the steam ascending the steam-conveying pipe is admitted to the cooking vessels. The pipes 25 are arranged at the lowermost portions of the vessels 22, whereby the water of condensation in the vessels is drained off into the steam-conveying pipe and by the latter discharged into the soup-cooking vessel. The steam-conveying pipe-section of the uppermost vessel is closed at its upper end, and said vessel is provided with a tight cover.

Any steam that may escape through the joints of the steam-conveying pipe is condensed on the outside of said pipe and drips down the latter into the filling-spout 2 of the boiler, thus preventing the water from dripping onto the stove and aiding in replenishing the boiler.

The operation of my improved apparatus will be readily understood. The bottom of the boiler being concavo-convex in shape will operate to collect and retain the heat, and cause it to circulate about the pendent water-tubes on all sides, rapidly generating steam and economizing the fuel. The steam from the boiler ascends the steam-conveying pipe and enters each cooking vessel, the water of condensation being drained off by the pipes 25 and discharged into the soup-receptacle, while the water of condensation collected on the outside of the steam-conveying pipe is discharged into the boiler and assists in replenishing the latter.

By means of the spouted hollow annulus in the coffee-cooking vessel the water is discharged or sprayed uniformly over the ground coffee and is thereby caused to saturate and percolate through every portion of the latter.

Having described my invention, what I claim is—

1. In a steam cooking apparatus, the combination with a boiler and a series of cooking vessels superimposed upon the boiler and a pipe for conveying steam from the boiler to each of the cooking vessels, of a coffee-cooking vessel having a perforated drip-tray arranged in its upper portion, a hollow annulus arranged over said drip-tray and provided with a series of radial discharge-spouts, and a filling-spout arranged on the vertical wall of the coffee-cooking vessel and communicating with the hollow annulus, substantially as described.

2. In a steam cooking apparatus, the combination with a boiler, of a series of cooking vessels superimposed one upon another and upon the boiler, a steam-conveying pipe-section for each vessel, said pipes registering with each other to form a continuous steam-pipe, connecting-pipes each communicating at one end with one of the vessels and projecting at its other end into one of the pipe-sections, and a funnel arranged in one of said pipe-sections and having its lower contracted end disposed over an aperture formed in the connecting-pipe below, substantially as described and for the purpose specified.

In testimony whereof I have hereunto set my hand in presence of two subscribing witnesses.

WILLIAM C. SALMON.

Witnesses:
C. N. STEWART,
G. W. NORRIS.